United States Patent Office 2,855,174
Patented Oct. 7, 1958

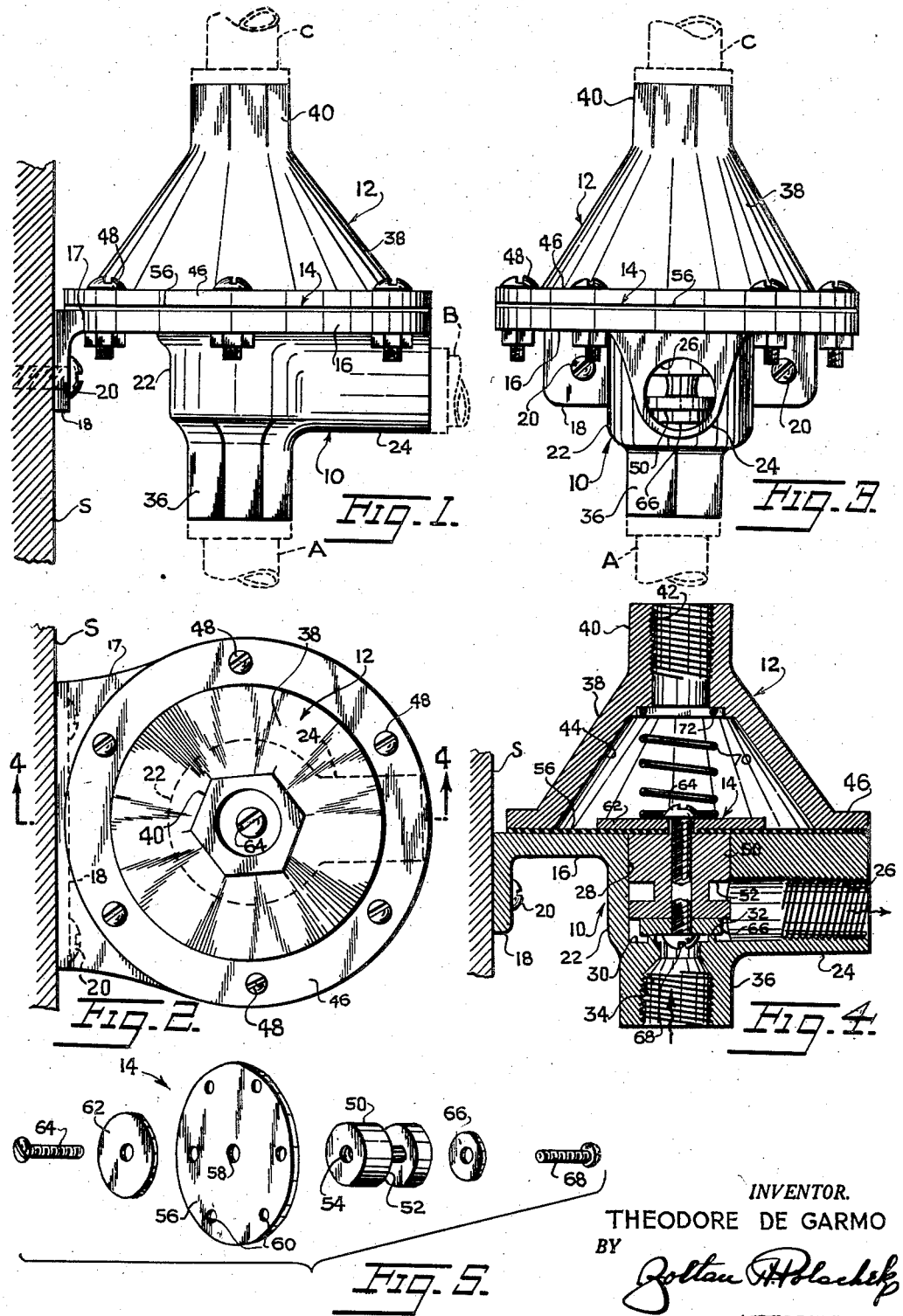

2,855,174

AUTOMATIC FUEL SUPPLY CUT-OFF DEVICE FOR ENGINES

Theodore De Garmo, Babylon, N. Y.

Application January 25, 1956, Serial No. 561,178

1 Claim. (Cl. 251—61)

This invention relates to devices for controlling the supply of fuel, such as gasoline, to engines. More specifically, the invention has reference to an automatically operable cutoff, adapted particularly to installation upon a marine engine, though not necessarily restricted to this use.

Summarized briefly, the invention includes a casing having a fuel passage therethrough. Within the casing a valve is spring biased to a position closing the passage, and against the restraint of the spring is biased to an open position by gasoline or other fuel flowing through the passage under pressure. Supplementing the action of the gasoline in holding the valve open is a vacuum condition caused in the casing responsive to operation of the engine in a normal manner. A diaphragm is connected directly to the valve, and seals the valve chamber and fuel passage from a chamber in which said vacuum condition arises. Thus, as long as fuel is being supplied under proper pressure to the engine, the valve will be forced to an open position to permit the continuous flow of the fuel. The movement of the valve to an open position against the spring bias thereof is supplemented by the mentioned vacuum condition. Accordingly, in the event there is a break in the fuel line, causing a loss of pressure against the valve, the spring is free to expand, to bias the valve to a closed position and thereby prevent any possible fire or explosion that may otherwise result due to the break in the line.

The main object of the invention is to provide a generally improved device of the nature referred to, which will be capable of installation on engines already in use with minimum difficulty, will operate efficiently to automatically close off the passage against the flow of fuel therethrough when pressure is lost, will be capable of manufacture at low cost, and will be so designed as to assure trouble-free operation over a long period of time.

A more specific object is to provide a fuel supply cutoff device that will be designed to cause a cooperating action to occur between the vacuum condition created in the intake manifold of the engine, on the one hand, and a pressure condition existing in the fuel line on the other hand, holding the valve in open position. On loss either of the pressure or of the vacuum condition, the device will immediately shift to a closed position, to prevent the mentioned fire, explosion, or other serious damage.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a side elevational view of the automatic fuel supply cutoff device, the dotted lines showing fuel and vacuum lines extending therefrom.

Fig. 2 is a top plan view of the device.

Fig. 3 is an elevational view of the cutoff device as seen from the right of Fig. 1.

Fig. 4 is a sectional view through the device on line 4—4 of Fig. 2, the valve being in closed position.

Fig. 5 is an exploded perspective view of the diaphragm and valve assembly, per se.

The fuel supply cutoff constituting the present invention includes a housing or casing, comprised of a pair of connected casing sections generally designated 10, 12, respectively, and cast from a suitable corrosion resistant metal. Enclosed by the casing is a combination diaphragm and valve assembly generally designated at 14.

Considering first the construction of the casing section 10, this includes a flat circular plate 16 having a flange-like extension 17 on its periphery integrally formed with a depending lip 18 connectable by screws 20 to an associated support S constituting any structural part of the engine or of the associated engine support frame or body.

Integral with the flange 16 at a central location upon the flange is a depending, large diameter, cylindrical body portion forming a valve housing 22, and integral with the flange and also with the valve housing is a tubular member 24 extending radially from the valve housing to the periphery of the plate 16. The tubular member has a bore opening at one end upon the outer end of the tubular member, said bore being designated at 26 and being threaded for part of its length as shown in Fig. 4. At its inner end, bore 26 is in communication with a valve chamber 28 provided in the valve housing and extending normally to the length of bore 26. Chamber 28 is provided at its lower end with a circumferential, internal shoulder 30 having an annular valve seat 32, and below the shoulder there is provided a threaded bore 34 having a reduced portion communicating with the valve chamber, said bore being formed in a depending prolongation 36 of the valve chamber.

Bores 26, 34 are thus extended at right angles to one another and communicate with each other through the valve chamber, thereby to provide an angular passage through which gasoline or other fuel normally flows in the direction of the arrows shown in Fig. 4. At the juncture of the angularly related portions of said passage, the valve chamber is disposed, with one portion of the passage communicating with the valve chamber at the side of the chamber and the other portion communicating with said chamber at one end thereof.

The casing section 12 also is formed from a single piece of material, and includes a frusto-conical body 38 integral at its upper, smaller end with an axial extension 40 having a threaded bore 42 communicating with a frusto-conical cavity 44 formed in body 38. The extension 40, as well as the prolongation 36, are exteriorly noncircular in cross section.

Integrally provided upon the larger end of the body 38 is an outwardly directed, continuous, circumferential flange 46, and in flange 46 and plate 16 registering openings are formed arranged in a series extending circumferentially of the flange and plate to receive connecting bolts 48.

Considering now the construction of the combination diaphragm and valve assembly 14, this includes a cylindrically shaped slidable valve element 50 of a diameter corresponding to that of the valve chamber. The valve element, adjacent one end thereof, has a deep, continuous circumferential groove 52, and formed in the valve element is an end to end, threaded, axial bore 54.

A circular diaphragm 56 is cemented or otherwise permanently secured at its center to the top surface of valve element 50, and is formed with a center opening 58 registering with bore 54. A marginal series of apertures 60, provided in the diaphragm, receives the connecting bolts 48 so that when the casing sections are connected they will engage between them the marginal part of the diaphragm, the diaphragm thus closing the larger, lower end of cavity 44.

Overlying the diaphragm is a washer 62 of a diameter somewhat greater than that of the valve element. A center opening is formed in the washer, and extending through the washer and diaphragm, and threadedly engaged in the upper end portion of bore 54, is a screw 64.

Bearing against the underside of the valve element is a washer 66, of a diameter slightly smaller than that of the valve element. This is connected to the lower end of the valve element by a screw 68 threaded in the lower end of bore 54.

When the valve is in its seated position, washer 66 is engaged tightly against the valve seat 32, to prevent the flow of fuel through the passage provided therefor in the casing.

A compression coil spring 70 is extended axially of and within cavity 44, bearing at one end against washer 62 and seating at its other end in a downwardly facing recess 72 formed at the juncture of the bore 42 and cavity 44. The spring is under tension effective to normally cause the valve element to be biased thereby to a closed position, and the tension of the spring is selected so as to cause the valve element to move to an open position against the restraint of the spring whenever gasoline is flowing through the passage under a predetermined amount of pressure and there is, at the same time, a vacuum condition created in the cavity 44 tending to supplement said pressure.

In use, fuel inlet line A is connected to the depending prolongation 36, a fuel outlet line B is connected to tubular member 24, and a vacuum line C is connected to extension 40, the line C extending from the intake manifold of the engine, not shown.

Due to this arrangement, fuel will be normally supplied under pressure through the cutoff device to the engine, with the valve element unseated and the diaphragm being flexed upwardly from its normal position shown in Fig. 4. When, however, there is a break in the fuel line, that might otherwise tend to cause an explosion or fire if the supply of fuel is not cut off, there will be a loss of pressure in the fuel passage, so that the spring 70 will immediately expand to seat the valve and shut off the supply of fuel.

The device can be installed at any desired location in the fuel line, of course, and as will be appreciated, can be readily installed on engines already in use without requiring any modification or redesign of said engines or of their associated fuel tanks.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new and desire to secure by United States Letters Patent is:

An automatic fuel supply cutoff device for engines, comprising a hollow casing having a fuel passage and a cavity adjacent said passage, said casing including means to connect the cavity in communication with a source of vacuum and means to connect the passage in a fuel line of an engine, and a combination diaphragm and valve assembly within said casing including a diaphragm at one end of the cavity flexible inwardly of the cavity out of a normal position, a rigid valve element connected to the diaphragm and normally seated in the passage to close the same in the normal position of the diaphragm, said valve element being arranged to unseat responsive to pressure exerted thereagainst by fuel flowing through the passage, thus to flex the diaphragm and unseat the valve element on the existence of both a pressure exerted by the flowing fuel against the valve element and a vacuum in the cavity, and a single coil spring tensioned to bias the valve element and diaphragm to their normal positions and yielding under the combined force exerted on the valve element and diaphragm by said fuel pressure and vacuum respectively, said casing comprising a pair of separably connected sections, the cavity being formed in one of the sections and the fuel passage being formed in the other section, the diaphragm being engaged between the sections to separate the passage from the cavity, said passage being formed intermediate its ends with a chamber, the valve element being slidably mounted in said chamber, the passage being of angular formation, so as to include inlet and outlet portions angularly related to each other, said chamber communicating with said portions of the passage at the juncture thereof, the inlet portion extending axially of said casing, said coil spring being aligned axially with the inlet portion within the cavity and the diaphragm normally lying in a plane perpendicular to the length of the inlet portion and paralleling the length of the outlet portion, the valve element sliding in said chamber in a path coaxially aligned with the inlet portion and coil spring, whereby on the passage of fuel into the passage throught the inlet portion, said fuel will exert pressure against the valve element in the direction of its movement thereby tending to shift the same axially of the casing against the restraint of said coil spring.

References Cited in the file of this patent
UNITED STATES PATENTS

| | | |
|---|---|---|
| 1,553,806 | Econopouly | Sept. 15, 1925 |
| 1,939,150 | Terry | Dec. 12, 1933 |
| 1,998,761 | Hueber | Apr. 23, 1935 |
| 2,169,683 | Dunham | Aug. 15, 1939 |
| 2,212,486 | Zoder | Aug. 20, 1940 |